Figure 1:
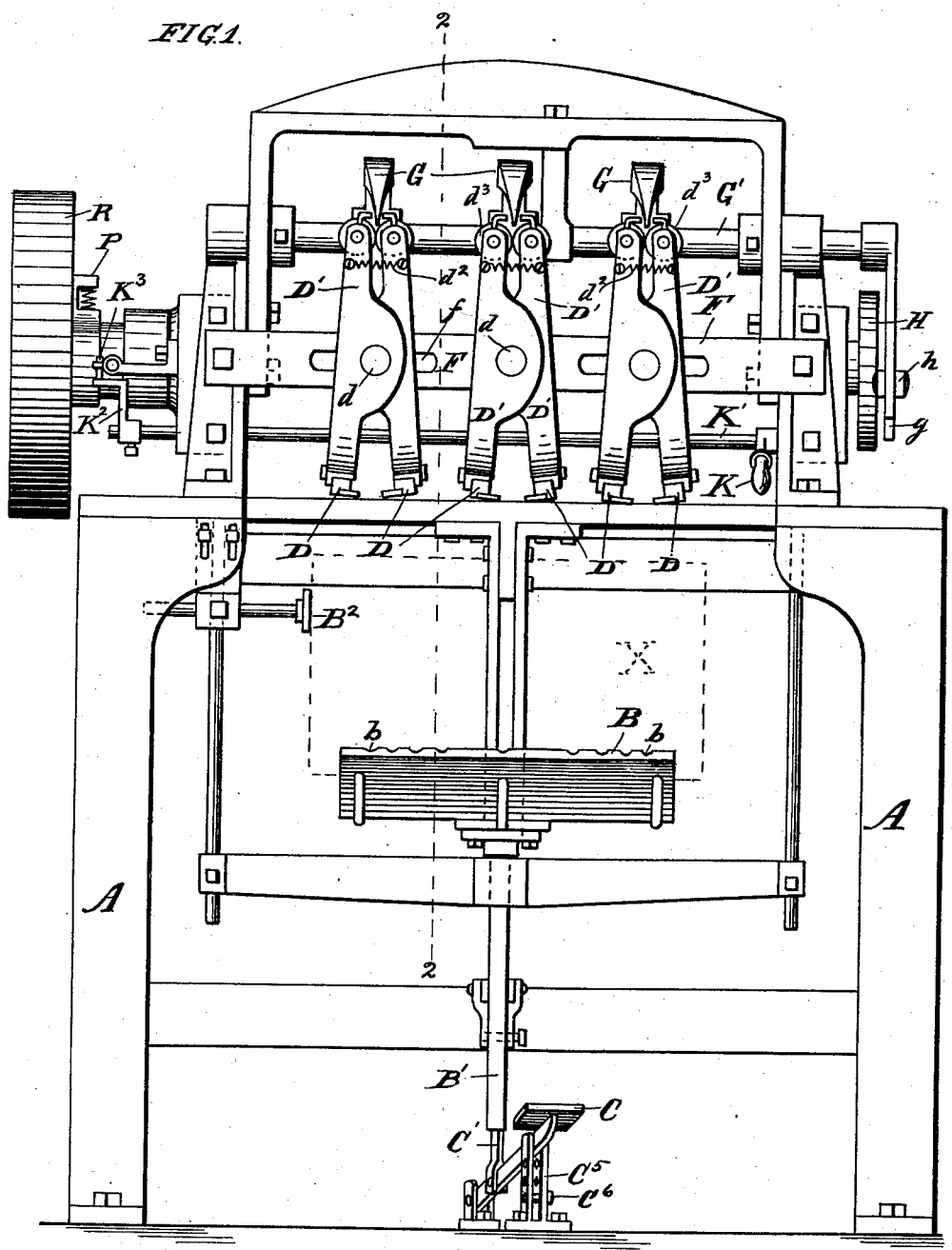

No. 676,232. Patented June 11, 1901.
J. G. HODGSON.
MACHINE FOR TIGHTENING WIRE HOOPS UPON JACKETED CANS OR OTHER VESSELS.
(Application filed Oct. 22, 1900.)
(No Model.) 3 Sheets—Sheet 1.

WITNESSES:
F. B. Townsend
H. W. Munday

INVENTOR.
John G. Hodgson
BY Munday, Evarts & Adcock
His ATTORNEYS.

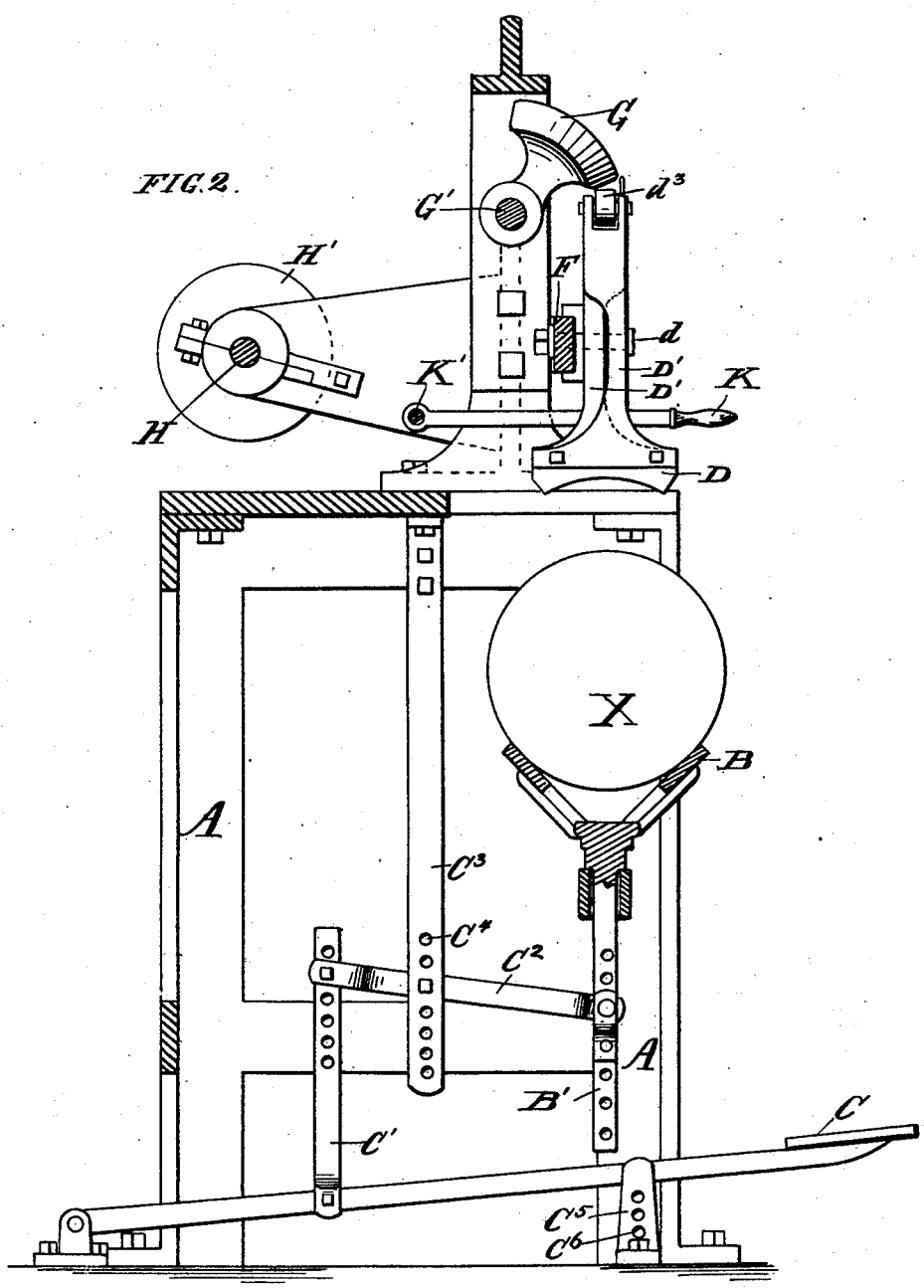

No. 676,232. Patented June 11, 1901.
J. G. HODGSON.
MACHINE FOR TIGHTENING WIRE HOOPS UPON JACKETED CANS OR OTHER VESSELS.
(Application filed Oct. 22, 1900.)
(No Model.) 3 Sheets—Sheet 3.
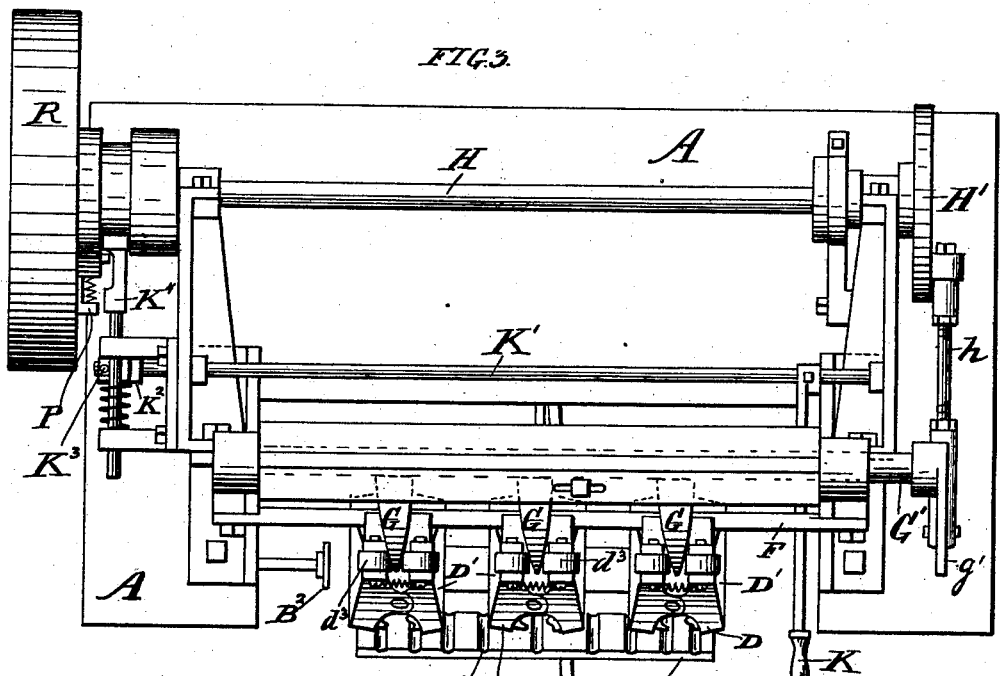
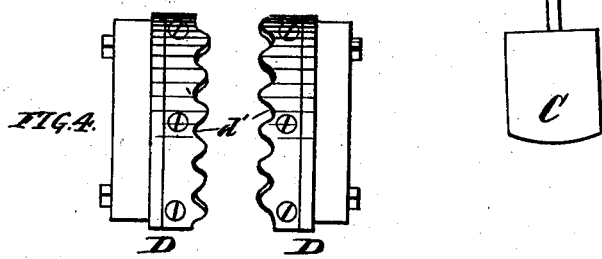
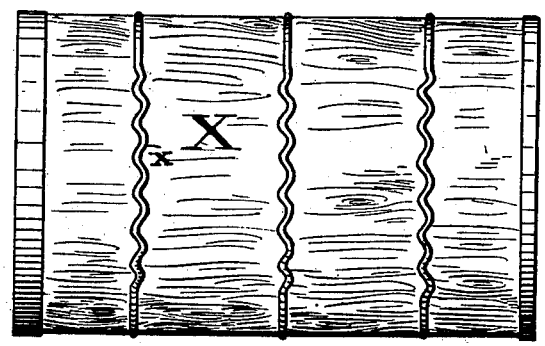
WITNESSES:
F. B. Townsend
H. W. Munday
INVENTOR.
John G. Hodgson
BY Munday, Evarts & Adcock
His ATTORNEYS.

United States Patent Office.

JOHN G. HODGSON, OF MAYWOOD, ILLINOIS, ASSIGNOR, BY MESNE ASSIGNMENTS, TO THE AMERICAN CAN COMPANY, OF JERSEY CITY, NEW JERSEY.

MACHINE FOR TIGHTENING WIRE HOOPS UPON JACKETED CANS OR OTHER VESSELS.

SPECIFICATION forming part of Letters Patent No. 676,232, dated June 11, 1901.

Application filed October 22, 1900. Serial No. 33,967. (No model.)

*To all whom it may concern:*

Be it known that I, JOHN G. HODGSON, a citizen of the United States, residing in Maywood, in the county of Cook and State of Illinois, have invented a new and useful Improvement in Machines for Tightening Wire Hoops upon Jacketed Cans or other Vessels, of which the following is a specification.

My invention relates to machines for tightening wire hoops upon jacketed cans or other vessels.

The object of my invention is to provide a machine of a simple, efficient, and durable construction by means of which electrically-welded wire hoops which are slipped loosely over or onto a jacketed can or other vessel may be securely and properly tightened thereon rapidly and cheaply by forming a series of short bends, kinks, or corrugations in the wire hoops.

My invention consists in the means I have devised for practically accomplishing this result—that is to say, it consists in the combination, with a movable holder upon which the jacketed can or other vessel is placed, of a series of pairs of segmental curved opening and closing wire-hoop-corrugating jaws between which the several hoops of the vessel are brought by the upward movement of the vessel-holder and which close together upon the wire hoops and form a series of corrugations or short bends therein, thus simultaneously tightening the hoops upon the vessel, the curvature of the segmental jaws corresponding to that of the jacketed can or vessel being operated upon.

In the accompanying drawings, forming a part of this specification, Figure 1 is a front elevation of a machine embodying my invention. Fig. 2 is a vertical cross-section on line 2 2 of Fig. 1. Fig. 3 is a plan view. Fig. 4 is a detail bottom view of one pair of the curved segmental corrugating-jaws; and Fig. 5 is a plan view of a wood-veneer jacketed can, showing its wire hoops after being tightened in the machine.

In said drawings, A represents the frame of the machine.

B is the movable holder in which the wood-veneer jacketed can or other vessel X is placed while its wire hoops $x$ are being operated upon. The vessel-holder B is moved up and down, as required, by a treadle C through the connecting-link C' and lever $C^2$ of the holder. The lever $C^2$ is pivoted to a support $C^3$, which is furnished with a series of pivot-holes $C^4$, as are also the link C' and stem B', to enable the machine to be adjusted for operation upon vessels of different sizes or diameters. The holder B is provided with transverse grooves $b$ to receive the wire hoops $x$ of the vessel and with a gage or guide $B^2$ for the end of the vessel to abut against.

D D are the segmental curved opening and closing wire-corrugating jaws, the operating-levers D' D' of each pair being pivoted together by a pin $d$, which passes through a horizontal slot $f$ in a bar F, upon which the operating-levers of the corrugating-jaws are thus all pivotally mounted. In their segmental curved meeting faces the jaws D are each provided with a series of corrugations $d'$.

The pairs of jaws D D are normally held open by springs $d^2$, so as to receive between them the wire hoops $x$ of the vessel, the curvature of the jaws being concentric with the vessel X upon which the hoops are to be tightened. The operating-levers D' D' are forcibly closed by segmental curved wedge-shaped arms G on a rock-shaft G', which forces said wedges or arms G between the upper ends of the corrugating-jaw levers D', the same being preferably furnished with anti-friction-rollers $d^3$ at their upper ends. The shaft G' is given a rocking movement as required from the driving-shaft H, which has a crank or disk H', connected by a pitman $h$ with a crank-arm $g$ on the rock-shaft G'.

K is the clutch-lever, which acts through the shaft K', arm $K^2$, pin $K^3$, and slide $K^4$ to operate the clutch P, by which the driving-shaft H is clutched to the driving-pulley R.

The segmental corrugating-jaws D are removably secured to the levers D', so that they may be conveniently removed when worn and replaced by new ones and also to adapt the same machine for operation upon vessels of different sizes by simply changing the jaws on the operating-levers D' and properly adjusting the holder B.

The treadle C is provided with a rest $C^5$, having adjustable stop-pins $C^6$ to limit the downward movement of the treadle, and thus cause the vessel X to be held in proper position to cause its hoops $x\ x\ x$ to register with the several pairs of jaws D D.

I claim—

1. The machine for tightening wire hoops upon jacketed cans or other vessels, comprising in combination a movable holder for the vessel and a series of pairs of opening and closing segmental curved corrugating-jaws, and a rock-shaft having wedge-arms for operating said jaws, substantially as specified.

2. The combination with a vessel-holder, of segmental curved wire-hoop-corrugating jaws, substantially as specified.

3. The combination with a movable vessel-holder, of a series of pairs of wire-hoop-corrugating jaws for tightening the hoops on the vessel, substantially as specified.

4. The combination with a vessel-holder, of segmental curved wire-hoop-corrugating jaws, and means for operating said jaws, substantially as specified.

5. The combination with a movable vessel-holder, of segmental curved wire-hoop-corrugating jaws, levers therefor, and a rock-shaft having a wedge-arm for operating said levers, substantially as specified.

6. The combination with movable holder B, of a series of pairs of segmental curved corrugating-jaws D D, levers D' D' therefor, slotted cross-bar F, and rock-shaft G' having wedge-arms G and means for rocking said shaft, substantially as specified.

JOHN G. HODGSON.

Witnesses:
EDMUND ADCOCK,
H. M. MUNDAY.